United States Patent
Bruekers et al.

(10) Patent No.: US 8,312,289 B2
(45) Date of Patent: *Nov. 13, 2012

(54) TEMPLATE RENEWAL IN HELPER DATA SYSTEMS

(75) Inventors: Alphons Antonius Maria Lambertus Bruekers, Eindhoven (NL); Thomas Andreas Maria Kevenaar, Eindhoven (NL); Minne Van Der Veen, Eindhoven (NL); Antonius Hermanus Maria Akkermans, Eindhoven (NL)

(73) Assignee: Koninklijke Philips Electronics, Eindhoven (NL)

( * ) Notice: Subject to any disclaimer, the term of this patent is extended or adjusted under 35 U.S.C. 154(b) by 855 days.

This patent is subject to a terminal disclaimer.

(21) Appl. No.: 11/916,092

(22) PCT Filed: May 23, 2006

(86) PCT No.: PCT/IB2006/051647
§ 371 (c)(1),
(2), (4) Date: Nov. 30, 2007

(87) PCT Pub. No.: WO2006/129242
PCT Pub. Date: Dec. 7, 2006

(65) Prior Publication Data
US 2009/0327747 A1 Dec. 31, 2009

(30) Foreign Application Priority Data
Jun. 1, 2005 (EP) .................................... 05104747

(51) Int. Cl.
*G06F 21/00* (2006.01)

(52) U.S. Cl. ...................................... 713/186

(58) Field of Classification Search .................. None
See application file for complete search history.

(56) References Cited

U.S. PATENT DOCUMENTS
5,546,462 A  8/1996 Indeck et al.
(Continued)

FOREIGN PATENT DOCUMENTS
EP   0740263   10/1996
(Continued)

OTHER PUBLICATIONS

Carbonaro A et al: "Object Tracking in a Varying Environment", Image Processing and Its Applications, Sixth International Conference in Dublin, Ireland, UK, IEEE, pp. 229-233, 1997, XP006508287.

(Continued)

*Primary Examiner* — Brandon Hoffman
(74) *Attorney, Agent, or Firm* — Smith Gambrell & Russell LLP (57) ABSTRACT

The invention provides a method for authenticating a physical object (OBJ) using a first helper data (W1) and a first control value (V1) associated with a reference object. The method comprises a step to generate a first property set (S1) using a noise compensating mapping (NCM) on information derived from the first helper data (W1) and a metric data (Y) associated with the physical object, and a step to establish a sufficient match between the physical object and the reference object using the first property set (S1) and the first control value (V1). The method further comprises a step to generate an update data (WUPD) for updating the first helper data (W1) using the first helper data (W1), the first property set (S1) and the metric data (Y). Also provided is a client terminal configured to carry out the method.

19 Claims, 9 Drawing Sheets

U.S. PATENT DOCUMENTS

2002/0146154 A1  10/2002  Davis et al.
2002/0174347 A1* 11/2002  Ting .............................. 713/186

FOREIGN PATENT DOCUMENTS

EP           1 385 117 A2    1/2004
WO           2004/104899 A2  12/2004

OTHER PUBLICATIONS

Umut Uludag et al: "Biometric Cryptosystems: Issues and Challenges", Proceedings of the IEEE, vol. 92, No. 6, pp. 948-960, 2004.

D. Denteneer et al: "Reliable Biometric Authentication With Privacy Protection", Acc. For the IEEE Benelux Symposium on Inf. Theory, The Netherlands, 2003.

J. P. Linnartz and P. Tuyls: "New Shielding Functions to Enhance Privacy and prevent Misuse of Biometric Template", Proceedings of AVBPA 2003, LNCS 2688, pp. 393-402, XP-002285062.

A. Juels and M. Wattenberg: "A Fuzzy Commitment Scheme", G. Tsudik Ed. Sixth ACM Conference on Computer and Information Security, pp. 28-36, ACM Press 1999.

* cited by examiner

TEMPLATE RENEWAL IN HELPER DATA SYSTEMS

The invention relates to a method for authenticating a physical object using a first helper data and a first control value associated with a reference object, the method comprising the following steps: generating a first property set using a noise compensating mapping on information derived from first helper data and a metric data associated with the physical object, establishing a sufficient match between the physical object and the reference object using the first property set and the first control value.

The invention further relates to a client terminal for authenticating a physical object using a first helper data and a first control value associated with a reference object, the client terminal comprising: a generation means arranged to generate a first property set using a noise compensating mapping on information derived from the first helper data and a metric data associated with the physical object, and an establishing means arranged to establish a sufficient match between the physical object and the reference object using the first property set and the first control value.

Identification and authentication are commonly used techniques for establishing identity. Identity could be the identity of a person or an object. Prime examples of application areas for identification and authentication are access control for buildings or information, authorization of payments and or other transactions. Identification and authentication are closely related concepts with a subtle difference.

During the process of authentication an object with an alleged identity is offered for authentication. Subsequently characteristics of the object offered for authentication are matched with those of the enrolled object with the alleged identity. If a sufficient match is found the identity of the object being authenticated is said to be the alleged identity. Authentication thus deals with matching one object being authenticated to one enrolled object based on the alleged identity.

During the process of identification of an object, the identity of a physical object is established by matching characteristics of the object with characteristics of previously enrolled objects. If a successful match is found the identity of the object being authenticated is said to be the identity of the matching object. The identification process can be seen as a repeated authentication process of an object with an enrolled object.

In practical authentication systems the authentication process is generally preceded by an enrolment process. During this enrolment characteristics of the object at hand are measured and stored. Based on the measured data so-called template data is generated for the object. This template data is used during the authentication process for matching enrolled objects with the measured characteristics.

Frequently there are processing steps involved in generating template data. Prime examples of such processing steps are e.g. averaging over multiple measurements to eliminate noise, and or feature extraction. As a result enrolment can be a time-consuming and costly process that has a large impact on the reliability of the authentication system.

Template data may at first glance present little value. However when this data is used on a regular basis to perform financial transactions its value becomes obvious. Furthermore in case of biometric authentication systems template data may also comprise privacy sensitive biometric data, and therefore have an even greater value.

International application WO 2004/104899 (PHNL030552) discloses a solution to this problem, in the form of a helper data system for authentication of a physical object.

A helper data system provides the authentication terminal with so-called helper data and a control value. Both are generated during enrolment and are used instead of the actual template data. The helper data is generated using the template data, but characteristics of the template data are obfuscated in such a way that there is hardly any correlation between the template data and the helper data. The control value is generated in parallel with the helper data and serves as a control value for the authentication process.

The helper data and control value are used during authentication. First the helper data is combined with data acquired from the physical object (e.g. facial feature data). This combined data is subsequently "condensed" into a second control value. This second control value is matched with the control value generated during enrolment. When these control values match authentication is successful.

The strength of the helper data system also presents a weakness. In a helper data system there is hardly any correlation between the helper data and the template data. When over time facial features change or when due to wear of a badge metrics gradually change, the likelihood of errors in the authentication process increases up to a point where the helper data system can no longer compensate for these gradual changes. Although it would be possible to repeat the re-enrolment process when facial features change, this implies temporary inability to authenticate and furthermore a costly re-enrolment procedure.

It is an object of the present invention to provide a method that can update helper data used during helper data based authentication without the need for re-enrolment.

This objective is realised in that the method as set forth in the introductory paragraph is further characterized in that it comprises a step to generate an update data for updating the first helper data using the first helper data, the first property set and the metric data.

Helper data systems comprise a noise robust mapping applied during enrolment, and a noise compensating mapping applied during authentication. This noise robust mapping is used to provide resilience to measurement errors in the (bio) metric data acquired from the physical object. The noise compensating mapping can be interpreted as the inverse of the noise robust mapping, where the noise robust mapping adds noise resilience, the noise compensating mapping uses this resilience to reconstruct the original message in the presence of noise.

The noise compensating mapping can compensate for measurement noise but also for structural changes in the (bio)metric data of a physical object. When the (bio)metric data changes this will reduce the resilience to measurement errors, as the noise robust mapping has to compensate both. If the (bio)metric data continues to change the system will fail at a certain moment in time when the noise robust mapping does not provide sufficient noise resilience.

The noise compensating mapping can compensate for noise in the measured data, due to the noise resilience present in the helper data. The present method proposes to use the margin provided by the noise robust mapping, to automatically generate update data to compensate for changes in the underlying biometric template.

As long as the noise robust mapping provides sufficient noise resilience, that is as long as the physical object can be successfully authenticated, the changes in biometry can be accurately computed. In these situations a secret that was used during the enrolment can be accurately reconstructed during authentication by the noise compensating mapping. This secret in combination with the (bio)metric data of the physical object acquired during the authentication process can be used to quantify said changes in (bio)metric data of the physical object.

Although this does not allow reconstruction of the template data, this does allow the construction of a new helper data that does account for the changes in (bio)metry and that leaves the noise resilience of the noise robust mapping for compensating measurement errors. As a result the present invention improves the over all robustness of the authentication system.

The present invention allows the generation of helper data update data during a successful authentication. This however does not imply that the helper data has to be updated every time that authentication is successful. An advantageous embodiment of the present invention will store update data generated for a particular reference object.

This in turn enables an objective analysis of the headroom for noise left in the helper data system, facilitating an analysis as to what extend the noise resilience is used for compensating structural changes, and to what extend it is used for compensating for measurement noise. Using this analysis the present method can be used to determine when the helper data has to be updated to prevent authentication failure due to changes in the underlying (bio)metry.

Update data can be an alternative helper data value that can be used in conjunction with the present control value, thereby allowing the replacement of the helper data by the update data. Alternatively the update data can be coded differentially, thereby requiring addition to the present helper data value before use.

A good class of a noise robust mappings for use with the present invention is the class of error correcting code encoding algorithm, or ECC encoding algorithms. The amount of noise resilience required is dependent on the amount of (bio) metric data and the average error in the data. The corresponding error correcting code decoding algorithm, or ECC decoding algorithm can be used as a noise compensating mapping.

This objective is further realised in that the client terminal as set forth in the second paragraph is further characterized in that the first generation means is arranged to generate an update data for updating the first helper data using the first helper data, the first property set and the metric data.

These and other aspects of the biometric authentication system will be further elucidated and described with reference to the drawing, in which.

Throughout the drawing, the same reference numeral refers to the same element, or an element that performs the same function.

Figure 1:
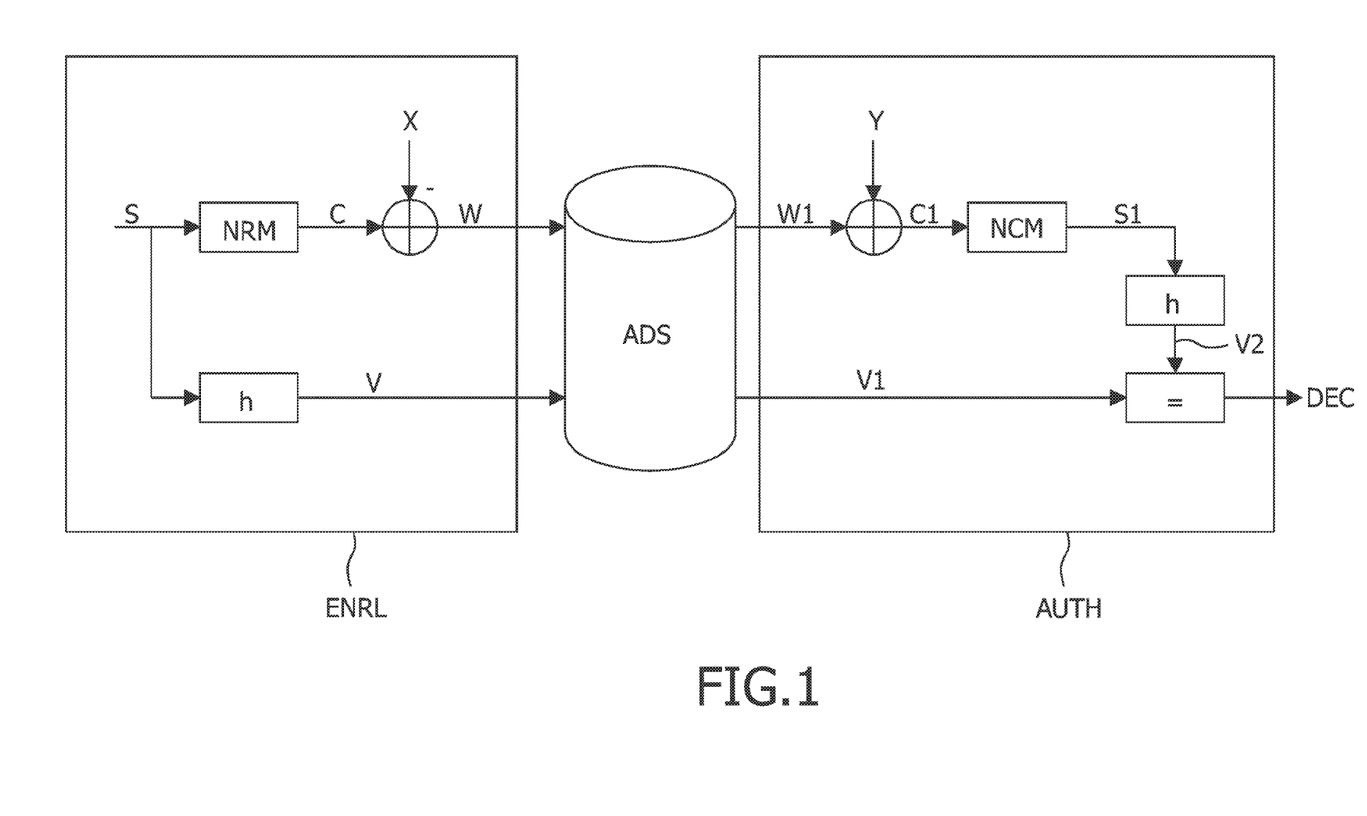
FIG. 1 is a block diagram of a helper data system for authentication of a physical object according to the prior art.

Before explaining the present invention in more detail the general concept of a helper data system is further elucidated using the block diagram in FIG. 1. FIG. 1 depicts a helper data system. The enrolment process ENRL is depicted on the left hand side. During the enrolment process ENRL a helper data W and a control value V are generated for the object being enrolled. This data is subsequently stored in the authentication data set ADS, located in the middle. During the authentication process AUTH depicted on the right hand side a physical object (not shown in FIG. 1) with an alleged identity is authenticated.

Initially the authentication data set ADS is searched for a reference object with the alleged identity. If there is no such reference object the authentication will fail. Provided the reference object is found, a helper data W1 and an accompanying control value V1 associated with the alleged identity are retrieved from the authentication data set ADS. This data is used to decide whether or not the physical object OBJ being authenticated sufficiently matches the reference object, resulting in a positive authentication.

Assume that the helper data system is used to authenticate persons using biometric data in the form of fingerprint data. Furthermore assume that the biometric template data comprises a graphical representation of the lines and ridges of the core area of the fingerprint. Issues such as the orientation and localization of the core area during acquisition are beyond the scope of the present description.

During the enrolment process ENRL a person presents his or her finger to a fingerprint scanner. The result from one or more fingerprint scans is used to construct a biometric template X. In addition, a possibly secret property set S is chosen. The property set S is mapped onto a property set C by means of a noise robust mapping NRM.

Subsequently the property set C is combined with biometric template X to produce a helper data W. In a practical helper data system the property set S and the noise robust mapping NRM are chosen such that the resulting helper data W does exhibit little or no correlation with the biometric template data X. As a result the use of helper data W does not expose the biometric template data X to malicious users.

To enable authentication the enrolment process also involves the generation of a control value V. Control value V is generated using the property set S. Although the control value V can be identical to the property set S this is not advisable in systems where security is an issue. In a secure helper data system it should not be possible to reconstruct the property set S using the control value V. This requirement is satisfied when the control value V is generated by application of a one-way mapping on the property set S. A cryptographic hash function and a trap-door one-way function are good examples of such one-way mappings. If security is not critical non one-way mappings could be used. Finally the pair of helper data W and control value V are stored in the authentication data set ADS.

Although a particular object can be identified using a single pair of helper data W and control value V, it is possible that a particular object can be identified using multiple pairs of helper data and control values. Additional helper data and control value pairs can be generated easily by selecting different property sets S. Multiple helper data and control value pairs can be particularly useful for managing access levels or for system renewal. For now assume a situation in which the authentication data set comprises only a single helper data and control value per enrolled object.

During the authentication process AUTH a biometric data Y (fingerprint) from a physical object (not shown in FIG. 1) is acquired. In addition an alleged identity is provided. The next step is to check whether the authentication data set ADS contains a first helper data W1 and a first control value V1 for a reference object with said alleged identity. If this is the case the first helper data W1 and the first control value V1 associated with the reference object are retrieved.

Next the biometric data Y from the physical object OBJ is combined with the first helper data W1 resulting in a second property set C1. In case the physical object corresponds to the reference object the biometric data Y can be interpreted as a noisy version of the biometric template X:

$$Y = X + N \text{ (where } N \text{ is small)}$$

The first helper data W1 can be represented by template data X and property set C:

$$W1 = C - X$$

By substitution the second property set C1 can be written as:

$$C1 = C - X + Y$$

$$C1 = C - X + X + N$$

$$C1 = C + N$$

The second property set C1 is passed to the noise compensating mapping NCM to produce a first property set S1. As long as the noise component N present in the biometric data Y is sufficiently small, or alternatively the noise robust mapping NRM is sufficiently robust, the noise compensating mapping NCM will reconstruct a first property set S1 that is identical to the original property set S as used during enrolment for generating the first helper data W1.

The first property set S1 is used to compute a second control value V2 in a similar fashion as the first control value V1. Next second control value V2 is compared with the first control value V1 generated during enrolment. Now assume that the reference object corresponds to the physical object. Provided the noise robust mapping NRM provides sufficient resilience to noise the second control value V2 will be identical to the first control value V1. If these values are identical, the authentication is successful, and the identity of the physical object OBJ is established as being the alleged identity.

The noise robust mapping NRM can be selected from a wide variety of mappings. A simple noise robust mapping NRM could involve the duplication of input symbols. In turn the noise compensating mapping NCM would require a majority vote on the received symbols. On the other end of the spectrum a more elaborate noise robust mapping NRM can be selected such as a Reed Solomon ECC encoder.

Figure 2:
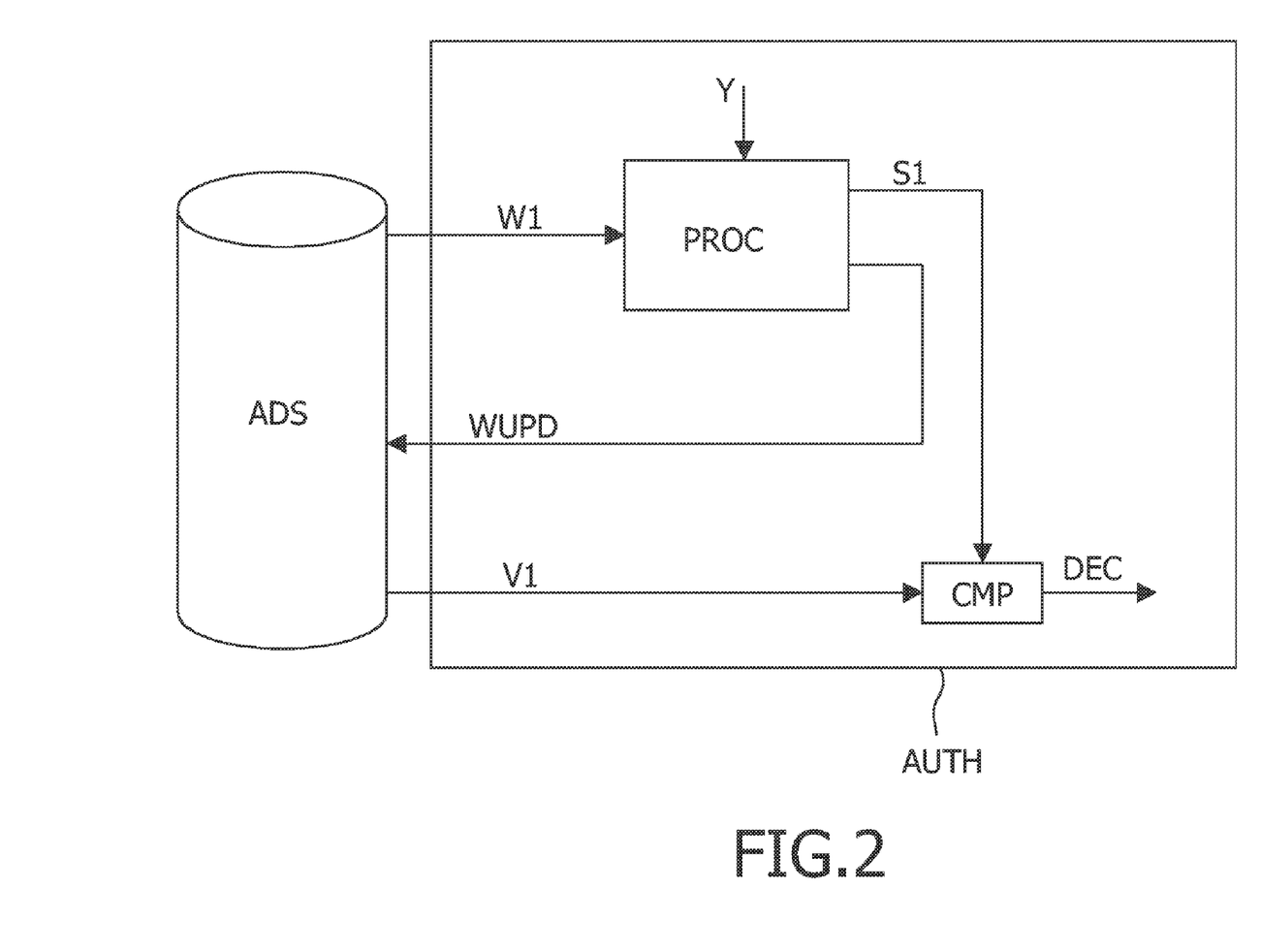
FIG. 2 is a block diagram illustrating a method according to the present invention for generating update data WUPD.

FIG. 2 presents a block diagram of a method according to the present invention illustrating the various steps for generating update data WUPD. The figure illustrates the actual authentication process and update data WUPD generation.

The authentication data set or ADS is located on the left hand side. The authentication data set comprises the enrolment data needed for authentication. Although the illustration depicts a single possibly central database this is not a prerequisite for the present invention.

During the authentication process a physical object is presented for authentication together with an alleged identity. Based on the alleged identity a pair of first helper data W1 and a first control value V1 are retrieved from the authentication data-set ADS. In parallel a metric data Y associated with the physical object can be acquired. Now assume that the reference object corresponds to the physical object.

The (bio)metric data Y and the first helper data W1 are combined and used to generate a first property set S1 in a processing step PROC. Effectively the noise compensating mapping is used to compensate for measurement noise in the (bio)metric data Y. If the noise robust mapping NRM provides sufficient noise resilience the first property set S1 after reconstruction equals the property set S used during enrolment in the generation of first helper data W1. This implies that authentication is said to be successful, and the physical object equals the reference object.

Effectively the embodiment in FIG. 2 verifies whether the noise robust mapping NRM provides sufficient noise resilience by matching the control value V1 with the property set S1, or a derivative thereof. In a helper data systems where security is key the control value V1 can be a cryptographic hash of the property set S. By comparing a hashed version of the first property set S1 with the control value V1 it is possible to establish whether authentication is successful.

The noise compensating mapping used in the processing step PROC depicted in FIG. 2 is used to generate the first property set S1, but in addition also generates an update data WUPD. In FIG. 3, FIG. 4, FIG. 5, and FIG. 6, this processing step PROC will be further elucidated.

Figure 3:
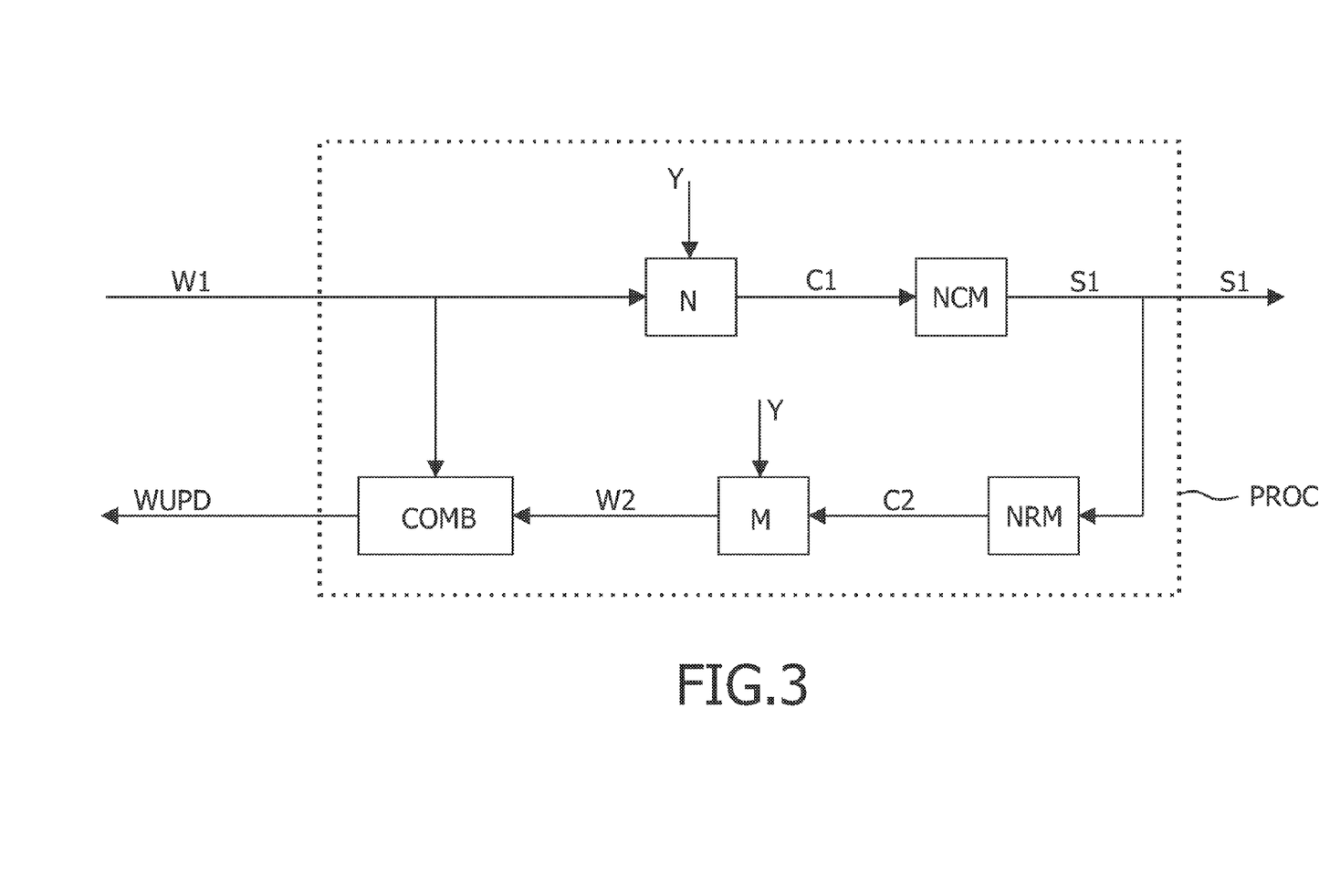
FIG. 3 is a block diagram illustrating the generation of an update data WUPD using a noise robust mapping and a noise compensating mapping.

FIG. 3 depicts a block diagram illustrating an implementation of processing step PROC used for generating update data WUPD by application of a noise compensating and noise robust mapping (NCM,NRM). The first step to generate an update data WUPD is to generate a second property set C1 by combining a first helper data W1 and a metric data Y using a first mapping N. Subsequently the second property set C1 is used to generate a first property set S1 by application of the noise compensating mapping NCM.

In case of a successful authentication the resulting first property set S1 corresponds to the property set S used during enrolment to generate first helper data W1. In this particular embodiment the first property set S1 is subsequently used to generate a second helper data W2 by subsequently applying the noise robust mapping NRM thereby producing a third property set C2, and then applying a second mapping M.

In case of a successful authentication the third property set C2 is identical to the property set C used during the enrolment process to generate first helper data W1. Consequently a second helper data W2 can be generated by applying the mapping M on third property set C2 and metric data Y.

In case the method from FIG. 2 is arranged to generate update data WUPD for use in the helper data system as presented in FIG. 1, the first mapping N and the second mapping M have to be chosen such that:

$$N(x,y) = x + y \text{ with } x = W1 \text{ and } y = Y$$

$$M(x,y) = x - y \text{ with } x = C2 \text{ and } y = Y$$

The present embodiment facilitates the generation of an update data (WUPD) without the need to know the original template data X used during authentication. Instead the present invention relies on the noise compensating mapping NCM to provide the first property set S1 that allows the generation of a second helper data value W2. In doing so the present embodiment allows helper data updates without the need for re-enrolment.

Although it is possible to replace the first helper data W1 with the second helper data W2 it makes sense to first establish whether there are significant changes that justify an update. For this purpose FIG. 3 comprises a combiner block COMB. If there are significant changes in the helper data it is essential to establish trends in these changes.

Trends can be detected by analysis of multiple update data values generated during multiple authentication processes for one particular reference object. For this purpose the combiner block COMB may comprise storage elements. Knowledge of trends together with characteristics of the noise robust mapping NRM can be used to improve the quality of the update value WUPD.

Two different approaches can be envisaged to update W1
1. Selecting one out of the plurality of previously generated update data values to replace W1.
2. Generating a new helper data to replace W1 based on previously generated update data values.

The first approach guarantees that the selected update data WUPD will, in combination with the (bio)metric data Y acquired during the generation of the selected update data WUPD, result in a maximal resilience to noise.

The second approach allows the generation of a new update data WUPD that does not correspond with any particular update data generated during a previous authentication process.

A simple implementation of the first approach (selection) uses the Hamming distance between an average update data and the individual update data as a selection criterion. First the average update data is determined on a per bit basis, by averaging all update data values for a particular reference object. Next that update data is selected that has the smallest Hamming distance to this average update data. The selected update data WUPD can be used to replace first helper data W1.

An implementation according to the second approach could calculate an average update data similar to that used in the previous example. But instead of selecting one particular update data generated earlier, an exhaustively search is performed for that helper data update value that; differs in less than threshold T positions from one of the update values stored, and has the smallest Hamming distance to the average update data value. Provided that the noise compensating mapping can correct T or more bit-errors. The threshold constraint warrants that the noise robust mapping is sufficiently robust so the noise compensating mapping can compensate for errors, whereas the second constraint helps select the most suitable candidate.

Apart from the selection of the best helper data update value, a second equally important question has to be answered: when to update the first helper data W1. Several criteria influence this selection and should be weighted for each individual application:
1. Warrant continuous robust detection
2. Limit the overhead for computation
3. Limit the overhead of storage The frequency of a helper data update affects the computational requirements it presents to the authentication system. To compensate for structural changes it does not make sense to update helper data during every successful authentication. However once a sufficient history has been acquired it is possible to perform helper data updates together with authentication or at arbitrary moments in time.

An important feature of the present invention is that it can provide tangible qualifiers that establish whether the underlying (bio)metric data is changing, and whether or not there is a probability for exceeding the capabilities of the noise robust mapping NRM. The combination of these two allow for timely updates of the helper data to warrant continuous robust authentication, even in the presence of structural changes in the underlying (bio)metry.

Figure 4:
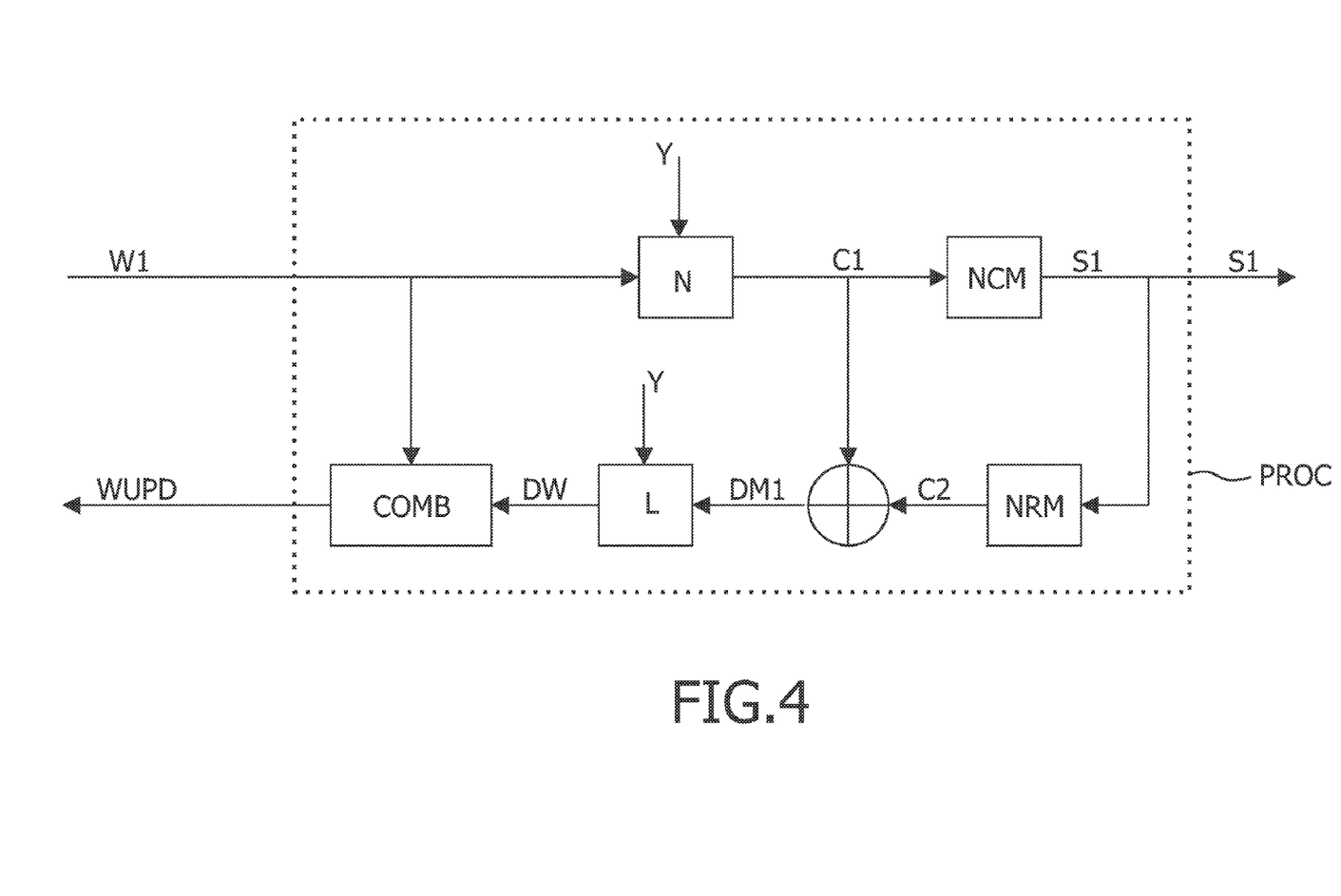
FIG. 4 is a block diagram illustrating the generation of an update data WUPD using a noise robust mapping and a noise compensating mapping to establish a difference measure.

FIG. 4 depicts a block diagram illustrating an implementation of processing step PROC used for generating update data WUPD using a noise compensating mapping NCM and a noise robust mapping NRM to establish a first difference measure DM1. The mapping in FIG. 4 differs from that in FIG. 3 in that it no longer computes a second helper data W2, but a delta helper data DW instead.

First a first difference measure DM1 is established between a second property set C1 and a third property set C2. Provided that the helper data generation process that generated the first helper data W1 during enrolment was a linear mapping on the property set C and template data X, it is possible to establish the first difference measure DM1 and use this to generate a delta helper data DW.

The difference measure DM1 is generated by subtracting the second property set C1 from the third property set C2. Next the first difference measure DM1 is scaled to compensate for first mapping N. To this end the first difference measure DM1 is passed to third mapping L resulting in the delta helper data DW. Once the delta helper data DW is established it can be used to update first helper data W1.

Figure 5:
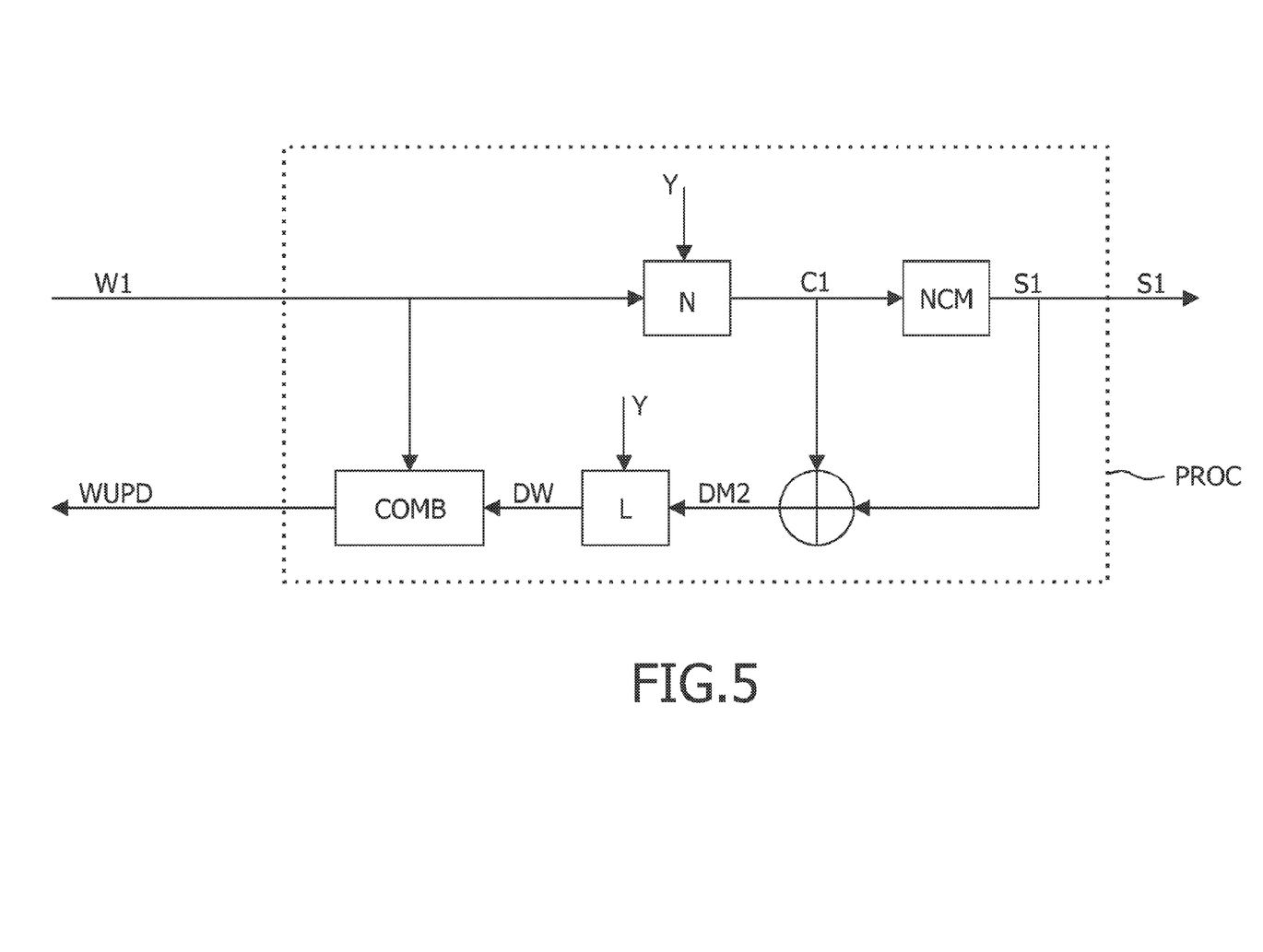
FIG. 5 is a block diagram illustrating the generation of an update data WUPD using a noise compensating mapping to establish a difference measure.

FIG. 5 depicts a block diagram illustrating an implementation of processing step PROC used for generating update data WUPD using a noise compensating mapping NCM to establish a second difference measure DM2. In comparison with the implementation in FIG. 4 the implementation in FIG. 5 does not apply a noise robust mapping on the first property set S1, but instead uses this particular property set instead of the third property set C2. This simplification is only possible if the noise robust mapping NRM exhibits particular characteristics.

In the previous embodiment both the noise compensating mapping NCM as well as the noise robust mapping NRM were used to establish a difference measure. However when a particular class of error correcting code encoder algorithm is used as a noise robust mapping, a difference measure can be generated without the need for re-applying the noise robust mapping NRM itself. This class of error correcting codes are so-called systematic error correcting codes.

A good example of such a code is a Reed Solomon block code. An input block comprises payload data and concatenated parity data. In turn an output block comprises of the corrected payload data and concatenated corrected parity data. In this case establishing a difference means does not require an additional encoding, but can be as simple as subtracting the decoder input block from the decoder output block.

The above scenario is illustrated in FIG. 5 the second property set C1 is subtracted from the first property set S1 to obtain a second difference measure DM2. This second difference measure can be subsequently scaled to compensate for first mapping N. The resulting delta helper data DW can be used to update first helper data W1.

Figure 6:
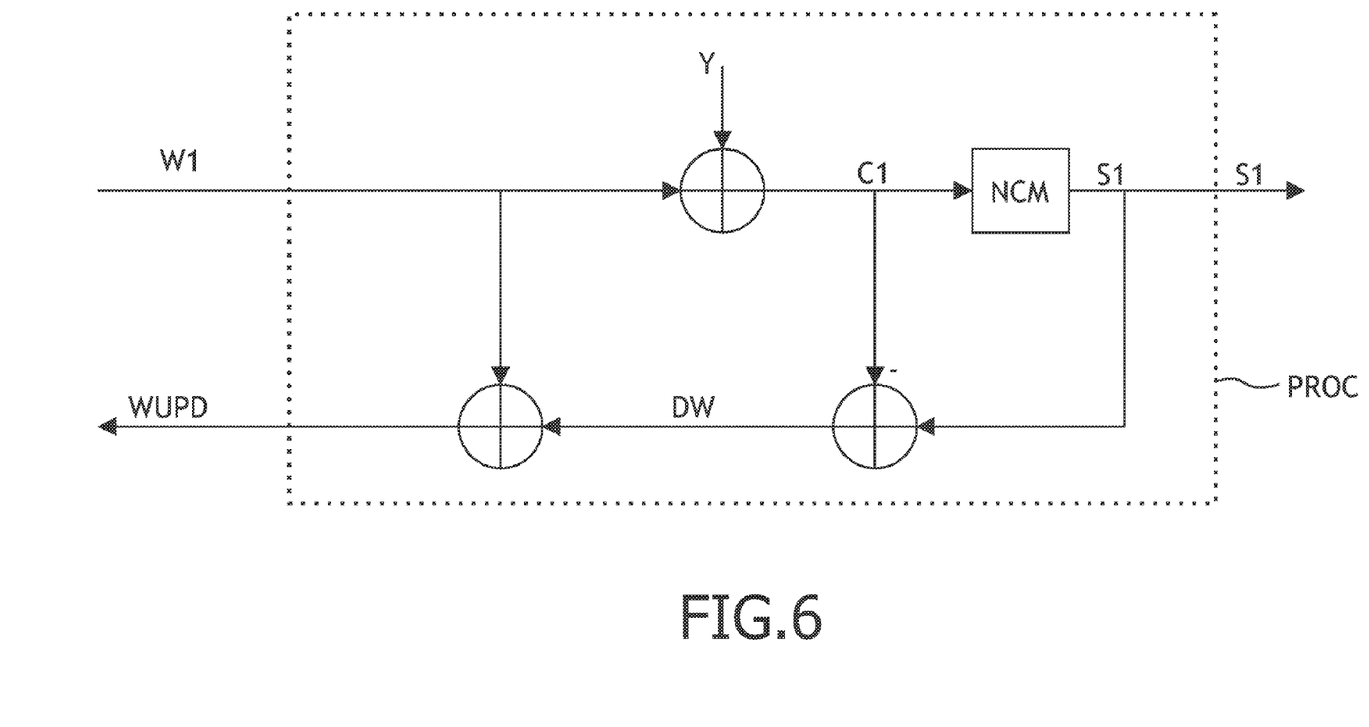
FIG. 6 is a block diagram illustrating the simplified generation of an update data WUPD using a noise compensating mapping to establish a difference measure.

FIG. 6 depicts a block diagram illustrating a simplified processing step PROC for generating update data WUPD using a noise compensating mapping to establish a difference measure. The implementation depicted in FIG. 6 is a particularly simple instance of the implementation presented in FIG. 5 where:

$$N(x,y)=x+y \text{ and where } x=W1 \text{ and } y=Y$$

$$L(x,y)=x \text{ and where } x=DM2$$

$$COMB(x,y)=x+y \text{ and where } x=DW \text{ and } y=W1$$

In practical helper data systems that implement a method according to the present invention the various steps are partitioned over system components. This partitioning affects the resource requirements of the various system components, requirements such as communication bandwidth, storage capacity, and processing capacity. These and other related matters are illustrated using three authentication systems shown in FIGS. 7, 8, and 9. Each of these systems comprises an advantageous embodiment of the present invention.

Figure 7:
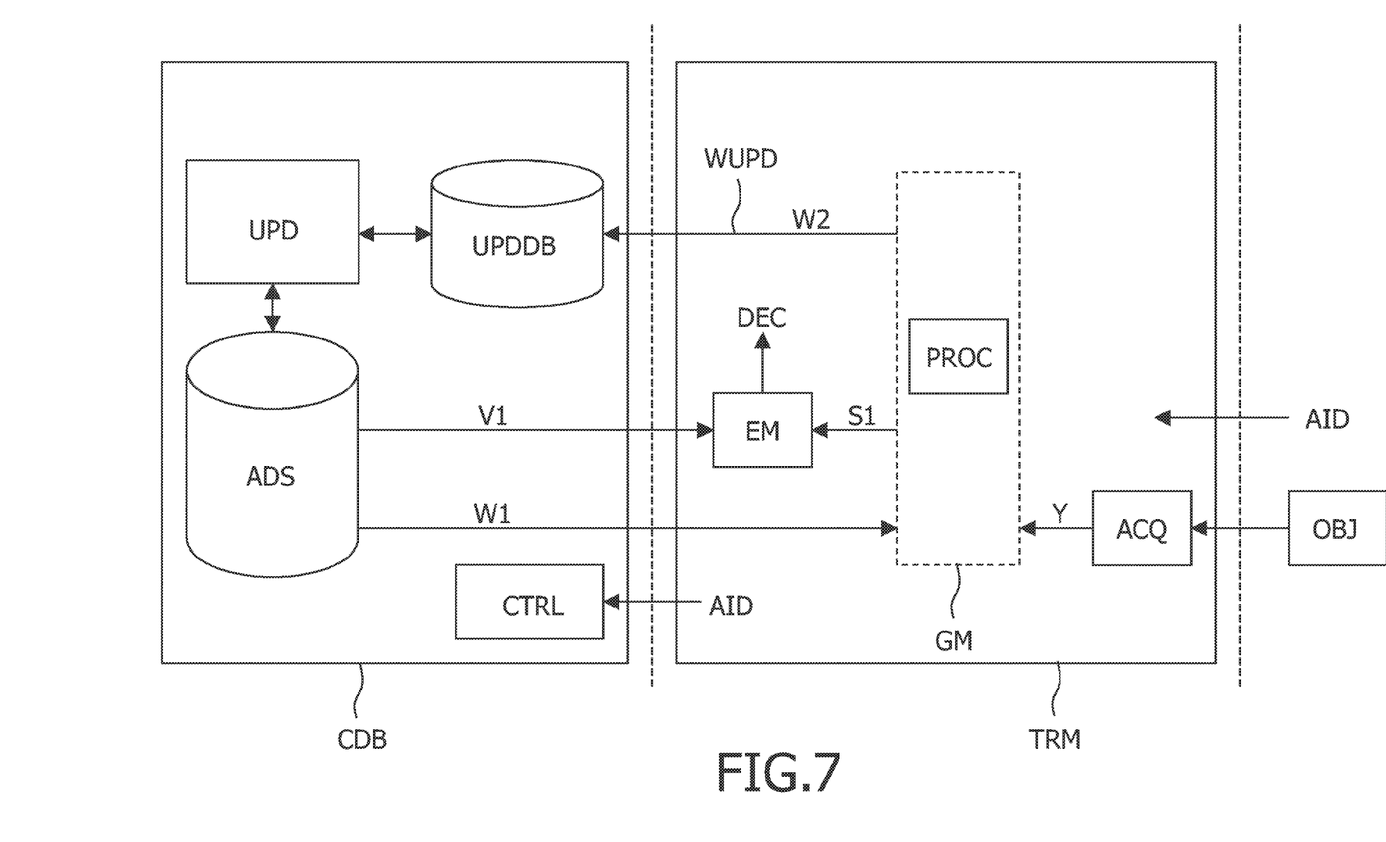
FIG. 7 is a block diagram of a helper data system for biometric authentication of a physical object that comprises a client terminal according to the present invention.

FIG. 7 depicts a block diagram of a helper data system for biometric authentication of a physical object OBJ that comprises a client terminal TRM according to the present invention. An example of such a system would be an access control terminal that requires fingerprint authentication.

The block diagram presented in FIG. 7 comprises a central database CDB on the left hand side and at least one client terminal TRM shown in the middle. The central database CDB comprises the authentication data set ADS, a helper data update means UPD, and an update data database UPDDB.

The client terminal TRM in turn comprises an acquisition means ACQ for acquiring a biometric template data Y. The acquisition means ACQ acquires a biometric data Y from the physical object OBJ. This biometric data Y could be either a raw or a processed version of the fingerprint. In addition the terminal acquires an alleged identity AID.

The client terminal TRM contacts the central database CDB and submits the alleged identity AID to the central database CDB. In case the authentication data set ADS comprises a reference object with the alleged identity AID, the central database CDB will provide the client terminal TRM with a first helper data W1 and a first control value V1 associated with the reference object.

The generation means GM comprises a processing step PROC as discussed earlier that generates a first property set S1. The first property set S1 is subsequently used to establish whether or not the authentication process is successful using the establishing means EM. In addition the generation means also generates an update data WUPD that is submitted to the central database CDB for storage in the update data database UPDDB.

In this embodiment the update data database UPDDB is located in the central database CDB, thereby providing the helper data update means UPD with local input. The advantage of the present embodiment is that helper data updates can be done centrally in a secure environment, possibly off-line. Here the client terminal TRM is involved in the preparation for, but not the actual update of the helper data. Further refinements to the system shown in FIG. 7 are possible.

One such refinement would be to reduce the number of helper data updates. Updating helper data after every successful authentication would result in a considerable load for the helper data update means UPD in the central database CDB.

A simple extension to the client terminal could greatly reduce this load. The client terminal TRM can be arranged to first establish a difference measure for the difference between the computed second helper data W2 and the first helper data W1. Based on this difference measure the client terminal TRM then only submits a new helper data to the central database CDB when this measure exceeds a pre-determined threshold value. As a result the load and computational requirements for the central helper data update means UPD can be greatly reduced by off loading part of the update procedure to the client terminal TRM.

The client terminal TRM addresses authentication, but with minor enhancements could be used for identification. In case of identification multiple objects from the authentication data set ADS, are compared with the metric data Y acquired from the physical object OBJ. In case of identification the physical object being identified does not provide an alleged identity. Instead the identity of the physical object OBJ can be derived from the identity of the reference object that provides a sufficient or best match. To this end TRM could be extended with an identity establishing means, that can retrieve the identity of the reference object from the authentication data set ADS, and can, based on the decision DEC, establish the identity of the physical object OBJ to be identical to that of the reference object.

Figure 8:
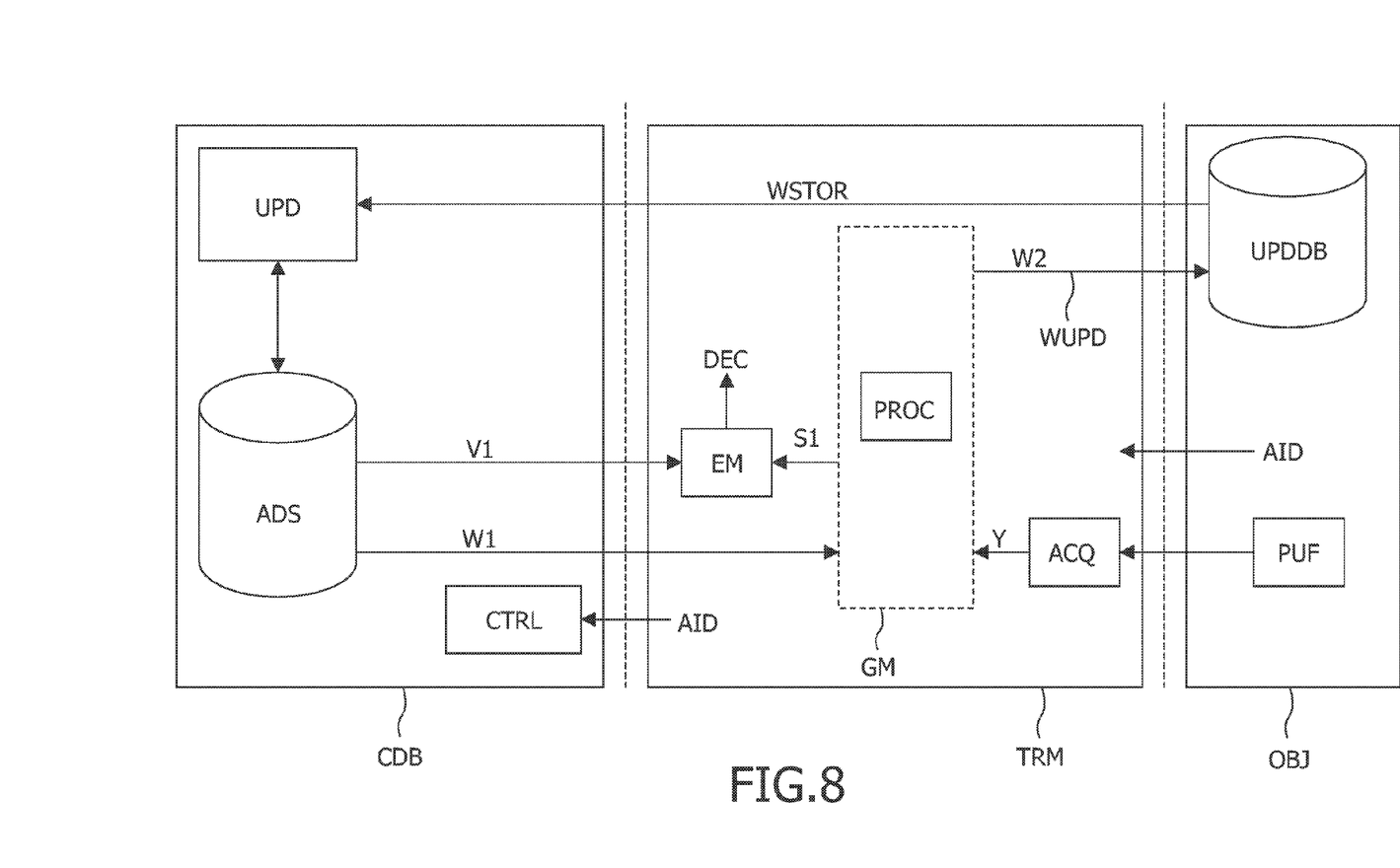
FIG. 8 is a block diagram of a helper data system for authentication of a smart-card that comprises a client terminal according to the present invention which employs a non-volatile storage on the smart-card as temporary storage for the update data WUPD.

An alternative embodiment of an authentication system applying helper data with built in helper data renewal is shown in FIG. 8. The key differences between FIG. 7 and FIG. 8 originate from the object being authenticated.

In the system presented in FIG. 8 the physical object OBJ being authenticated is a smart-card that is authenticated using a built-in optical Physical Uncloneable Function, or PUF. The PUF on the smart-card provides unique characteristics that can be used to authenticate the smart-card. To reduce the likelihood that people can track and or even reproduce said PUF a helper data system can be used.

However, if the PUF is affected by wear and or aging, the smart-card could be rendered useless once the underlying metrics vary or drift too much. The present invention offers facilities to prevent the PUF from being rendered useless by compensating for these changes by updating the first helper data W1 for the physical object OBJ located in the authentication data-set ADS.

In contrast to the system from FIG. 7 the present system uses a local non-volatile storage on the smart-card to provide temporary storage for update data, in doing so the central database CDB does not have to store update data centrally for all objects in the system but instead can benefit from the use of distributed storage throughout the system.

As the helper data and update data as such provide little or no information with respect to the underlying metric this storage does not have to be secure. Although the presence of local storage on the smart-card could facilitate pre-processing of helper data by the smart-card, power dissipation and processing limitations of the smart-card limit this potential.

When helper data in the central database CDB is being updated, stored update data WSTOR is retrieved from the smart-card and passed to the central database. Here the new helper data is computed and stored in the authentication data set ADS. The amount of data that has to pass from the smart-card to the central database CDB during the helper data update process may provide an undesirable bottleneck. A part of the update process could be handled by the client terminal TRM to reduce the communication bottleneck.

Figure 9:
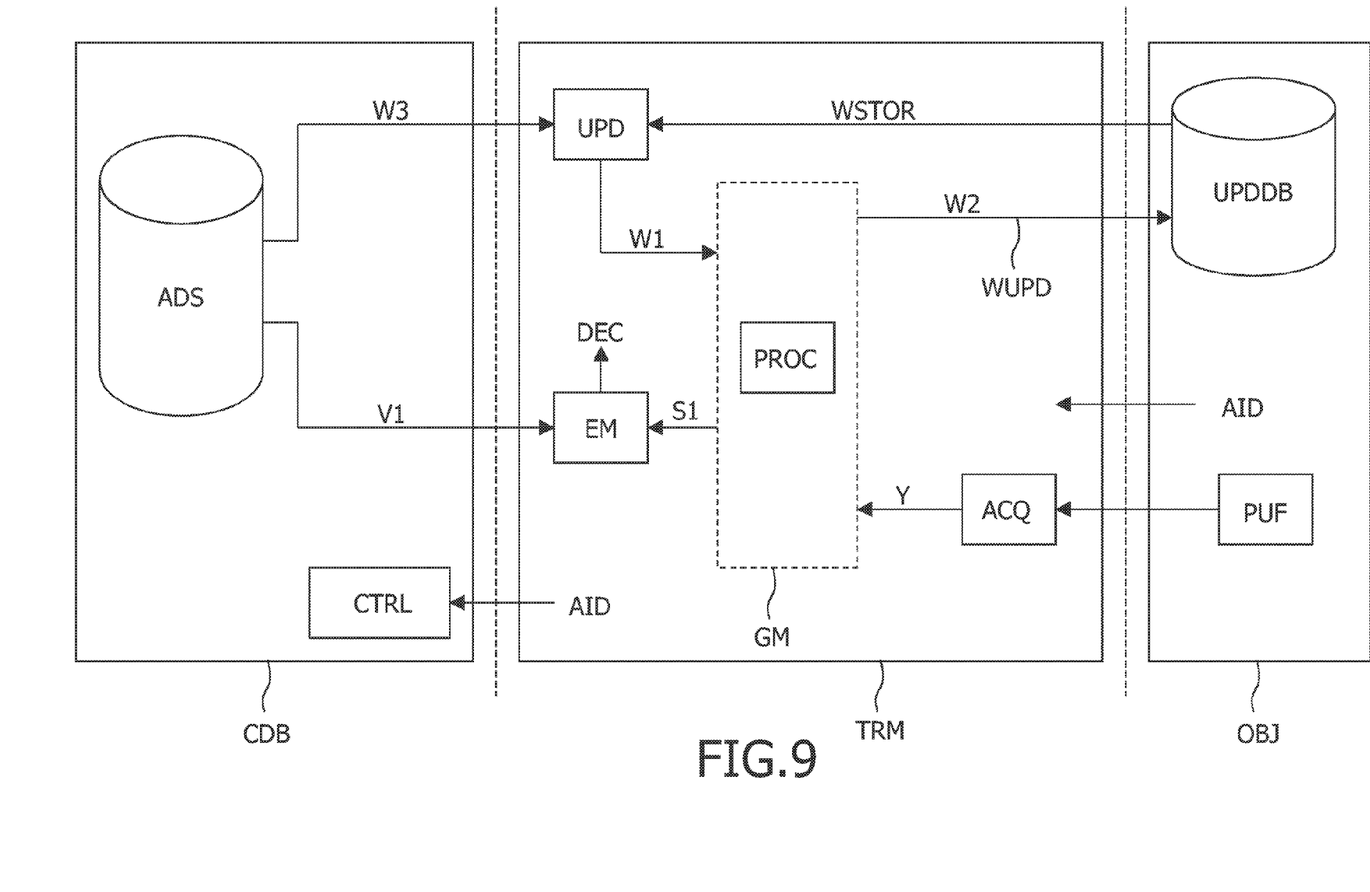
FIG. 9 is a block diagram of a helper data system for authentication of a smart-card that comprises a client terminal according to the present invention which comprises helper data generation means and employs a non-volatile storage on said smart-card as temporary storage for the update data WUPD.

The client terminal TRM depicted in FIG. 9 provides an alternate solution for both the processing and bandwidth issues. The embodiment in FIG. 9 uses local non-volatile storage on the smart-card as the update data database UPDDB. The update data stored here is not used to update the centrally stored helper data, but is used in conjunction with the centrally stored helper data to generate a new first helper data W1 for use during authentication. In this respect the embodiment shown in FIG. 9 differs from both the systems in FIG. 7 and FIG. 8, here the first helper data W1 for authentication is generated "on the fly".

As a result the central database CDB can be simplified. There is no more need for central storage of update data, nor is there a need for computational capacity for updating helper data stored in the authentication data set ADS. Instead the central database CDB provides the client terminal TRM with a helper data W3 and a first control value V1.

The client terminal TRM uses the helper data W3, and one or more stored update data to generate a first helper data W1 that will be used for authentication of the physical object OBJ.

As a result the complexity of the client terminal TRM will grow, but the bandwidth requirements towards the central database are substantially reduced as the exchange of stored update data is localized. An additional advantage presented by this embodiment is the fact that the helper data W3 stored in the authentication data set ADS remains unaffected. In previously discussed embodiments the first helper data was updated and subsequently stored in the authentication data set ADS. Here the helper data in the authentication data set, the helper data W3, remains unaffected. As a result the first helper data W1 generated by the update means UPD uses the original unaltered helper data W3 for generating first helper data W1. As a result the first helper data W1 cannot gradually "drift" away from the original helper data W3.

Various implementations that restrict helper drift data can be devised. One implementation first determines the Hamming distance between a newly generated first helper data W1 and the helper data W3 stored in the authentication data set. If this difference exceeds a pre-determined threshold the previously generated first helper data is used instead of the newly generated first helper data. In doing so the helper data updating means UPD can restrict drift of helper data, and can effectively limit the likelihood of aliasing between different helper data and control value pairs.

Helper data drift can be prevented in embodiments of the present invention by preserving the original helper data recorded during the enrolment process as a reference. However, by limiting the update capabilities the likelihood that eventually a re-enrolment of a physical object is needed increases.

The embodiment shown in FIG. 9 is only indicative of the present invention, and should not be interpreted as restrictive. As illustrated by the embodiments in FIGS. 7, 8, and 9 authentication systems employing a client terminal TRM according to the present method can be partitioned in various ways resulting in characteristics that can be used advantageously in a particular context.

The embodiments discussed represent methods and client terminals in which a single first helper data W1 and a single first control value V1 are used to identify a physical object. The present invention is not restricted to such systems, and can also be applied to systems where multiple pairs of helper data and control values, or even one helper data and multiple control values are used to authenticate a physical object.

Although all embodiments discussed focus on the authentication process, the present invention can be applied equally well on an identification process. During the identification process reference objects from an enrolment database are matched with the physical object under identification. This process can be seen as a repeated authentication process, where the alleged identity equals the identity of the reference object, and as such the present invention also applies to identification methods and client terminals implementing such methods.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method for authenticating the identity of a physical object (OBJ) by means of metric data using a helper data system, which helper data system during an enrolment step
generates a first helper data (W1) and a first control value (V1) associated with metric data (X) of a reference object, the method further comprising the following verification steps:
generating a first property set (S1) using a noise compensating mapping (NCM) on information derived from first helper data (W1) and a metric data (Y) associated with the physical object (OBJ) to be authenticated,
establishing a sufficient match between the physical object (OBJ) and the reference object using the first property set (S1) and the first control value (V1), the method further characterized in that it comprises a step of
generating an update data (WUPD) using the first helper data (W1), the first property set (S1) and the metric data (Y), said update data (WUPD) being used for updating the first helper data (W1).

2. A method as claimed in claim 1, where the update data (WUPD) is chosen such that the updated helper data (W1) in conjunction with metric data (Y) results in a sufficient match during authentication.

3. A method as claimed in claim 1, where the step to generate a first property set (S1) further comprises the generation of a second property set (C1) using a first mapping (N) on information comprising the first helper data (W1) and the metric data (Y), the step to generate a first property set (S1) uses a noise compensating mapping (NCM) on the second property set (C1) to generate the first property set (S1).

4. A method as claimed in claim 3, where the step to generate an update data (WUPD) comprises the generation of a third property set (C2) by applying a noise robust mapping (NRM) on the first property set (S1).

5. A method as claimed in claim 4, where the step to generate an update data (WUPD) comprises the application of a second mapping (M) on information comprising third property set (C2) and the metric data (Y).

6. A method as claimed in claim 4, where
the step to generate an update data (WUPD) comprises the generation of a first difference measure (DM1) quantifying the difference between the second property set (C1) and the third property set (C2), and where
the update data (WUPD) is generated by applying a third mapping (L) on information comprising the first difference measure (DM1).

7. A method as claimed in claim 3, where
the step to generate an update data (WUPD) comprises the generation of a second difference measure (DM2) quantifying the difference between the first property set (S1) and the second property set (C1), and where
the update data (WUPD) is generated by applying a third mapping (L) on information comprising the second difference measure (DM2).

8. A method as claimed in claim 1, where the update data (WUPD) is stored for later reference.

9. A method as claimed in claim 8, where the method further comprises a step for selecting one out of a plurality of generated and stored update data (WSTOR) to replace first helper data (W1).

10. A method as claimed in claim 8, where the method further comprises a step for generating a replacement helper data using at least one out of the plurality of generated and stored update data (WSTOR) to replace the first helper data (W1).

11. A method as claimed in claim 1, where the first helper data (W1) is updated using the update data (WUPD) when a sufficient match between the physical object (OBJ) and the reference object is found.

12. A method as claimed in claim 8, where the first helper data (W1) is updated using at least one out of the plurality of generated and stored update data (WSTOR).

13. A method for identification of a physical object (OBJ) using a first helper data (W1) and a first control value (V1) associated with a reference object, the method according to claim 1, further comprising a step for establishing the identity of the physical object (OBJ) as being identical to that of the reference object.

14. A client terminal (TRM) for authenticating a physical object (OBJ) using a first helper data (W1) and a first control value (V1) associated with a reference object, the client terminal (TRM) comprising:

a generation means (GM) arranged to generate a first property set (S1) using a noise compensating mapping (NCM) on information derived from the first helper data (W1) and a metric data (Y) associated with the physical object, and an establishing means (EM) arranged to establish a sufficient match between the physical object and the reference object using the first property set (S1) and the first control value (V1), and the client terminal (TRM) further characterized in that the first generation means is arranged to generate an update data (WUPD) for updating the first helper data (W1) using the first helper data (W1), the first property set (S1) and the metric data (Y).

15. A client terminal (TRM) as claimed in claim 14, where the update data (WUPD) is chosen such that the updated helper data (W1) in conjunction with metric data (Y) results in a sufficient match during authentication.

16. A client terminal (TRM) as claimed in claim 14, where the client terminal (TRM) further comprises a storage means for storing the update data (WUPD) generated during authentication of said physical object (OBJ) for later reference.

17. A client terminal (TRM) as claimed in claim 14, where the client terminal (TRM) is arranged to output the updated data (WUPD) generated during authentication of the physical object (OBJ) for storage outside the client terminal (TRM).

18. A client terminal (TRM) as claimed in claim 14, where the client terminal (TRM) retrieves at least one out of the plurality of generated and stored update data (WSTOR) from the physical object (OBJ) being identified for use in the authentication of said physical object (OBJ).

19. A computer program product comprising program code means stored on a computer readable medium for performing the method of claim 1 when said program product is run on a computer.

* * * * *

UNITED STATES PATENT AND TRADEMARK OFFICE
CERTIFICATE OF CORRECTION

PATENT NO. : 8,312,289 B2  
APPLICATION NO. : 11/916092  
DATED : November 13, 2012  
INVENTOR(S) : Bruekers et al.

Page 1 of 1

It is certified that error appears in the above-identified patent and that said Letters Patent is hereby corrected as shown below:

Title Page, Item (73) Assignee should read as follows:

PRIV ID B.V.

Signed and Sealed this
Twenty-fourth Day of November, 2015

Michelle K. Lee  
*Director of the United States Patent and Trademark Office*